US012592218B2

(12) United States Patent
Tsuru et al.

(10) Patent No.: US 12,592,218 B2
(45) Date of Patent: Mar. 31, 2026

(54) COMMUNICATION DEVICE, COMMUNICATION METHOD, AND NON-TRANSITORY STORAGE MEDIUM

(71) Applicant: JVCKENWOOD Corporation, Yokohama (JP)

(72) Inventors: Hideo Tsuru, Yokohama (JP); Motomu Takada, Yokohama (JP); Hideya Tsujii, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 433 days.

(21) Appl. No.: 18/178,563

(22) Filed: Mar. 6, 2023

(65) Prior Publication Data

US 2023/0206905 A1      Jun. 29, 2023

Related U.S. Application Data

(63) Continuation of application No. PCT/JP2021/035085, filed on Sep. 24, 2021.

(30) Foreign Application Priority Data

Sep. 24, 2020 (JP) ................................. 2020-160163

(51) Int. Cl.
*G10L 15/02* (2006.01)
*G10L 15/24* (2013.01)

(52) U.S. Cl.
CPC .............. *G10L 15/02* (2013.01); *G10L 15/24* (2013.01); *G10L 2015/025* (2013.01)

(58) Field of Classification Search
CPC ... G10L 15/02; G10L 15/24; G10L 2015/025; G06F 3/16; H04R 23/00

(Continued)

(56) References Cited

U.S. PATENT DOCUMENTS 4,181,813 A * 1/1980 Marley ................... G10L 19/00
704/E11.005
4,284,846 A * 8/1981 Marley ................... G10L 19/00
704/253

(Continued)

FOREIGN PATENT DOCUMENTS

JP       2006-025333       1/2006
JP       2014-143582       8/2014

(Continued)

OTHER PUBLICATIONS

International Search Report and Written Opinion for International Application No. PCT/JP2021/035085 mailed on Dec. 14, 2021, 10 pages.

*Primary Examiner* — Thuykhanh Le

(74) *Attorney, Agent, or Firm* — Amin, Turocy & Watson, LLP

(57) ABSTRACT

A communication device includes: a vibration transmitting unit configured to transmit an input vibration wave to a first portion of a subject; a vibration receiving unit configured to receive, at a second portion of the subject, an output vibration wave generated based on the input vibration wave propagated through at least a part of the subject; and a speech recognition device configured to recognize a phoneme which is uttered by the subject based on a difference wave between the input vibration wave and the output vibration wave, wherein the first portion and the second portion are arranged on right and left of the subject.

3 Claims, 6 Drawing Sheets

(58) Field of Classification Search
USPC ........................................................ 704/231
See application file for complete search history.

(56) References Cited

U.S. PATENT DOCUMENTS

| | | | |
|---|---|---|---|
| 9,536,523 B2 * | 1/2017 | Bakish ................. | G10L 15/187 |
| 10,079,014 B2 * | 9/2018 | Naik ..................... | G10L 15/187 |
| 10,535,364 B1 * | 1/2020 | Zhong ................... | G10L 25/78 |
| 10,595,151 B1 * | 3/2020 | Chen .................... | H04R 1/1041 |
| 10,658,995 B1 * | 5/2020 | Bowers ............... | H04R 1/1041 |
| 10,728,649 B1 * | 7/2020 | Holman .............. | H04R 1/1091 |
| 11,113,859 B1 * | 9/2021 | Xiao ..................... | G06T 15/005 |
| 2005/0244020 A1 * | 11/2005 | Nakajima .............. | G10L 21/06 |
| | | | 704/E15.041 |
| 2006/0020473 A1 * | 1/2006 | Hiroe ................... | G10L 13/027 |
| | | | 704/275 |
| 2007/0088544 A1 * | 4/2007 | Acero ................... | G10L 21/02 |
| | | | 704/226 |
| 2010/0036657 A1 * | 2/2010 | Morisaki ................ | G10L 15/24 |
| | | | 704/E15.001 |
| 2010/0322437 A1 * | 12/2010 | Matsuo ............... | G10L 21/0208 |
| | | | 381/94.2 |
| 2015/0066487 A1 * | 3/2015 | Matsuo .............. | G10L 19/0212 |
| | | | 704/204 |
| 2017/0365256 A1 * | 12/2017 | Stylianou ............. | G10L 21/057 |
| 2018/0014102 A1 * | 1/2018 | Hirsch .................. | H04R 25/55 |
| 2018/0063618 A1 * | 3/2018 | Boesen ................. | A61B 5/123 |
| 2018/0108356 A1 * | 4/2018 | Mizumoto ............. | G10L 15/26 |
| 2019/0013015 A1 * | 1/2019 | Menendez-Pidal ......................... | |
| | | | G10L 15/144 |
| 2019/0139567 A1 * | 5/2019 | Graf ........................ | G10L 25/93 |
| 2019/0253809 A1 * | 8/2019 | Kunimoto ............... | H04R 1/24 |
| 2020/0111476 A1 * | 4/2020 | Kamano ................ | G10L 15/02 |
| 2020/0125318 A1 | 4/2020 | Konagai | |
| 2020/0296521 A1 * | 9/2020 | Wexler ................... | G06F 3/167 |
| 2020/0314565 A1 * | 10/2020 | Sigwanz ............... | H04R 25/40 |
| 2020/0344544 A1 * | 10/2020 | Hunt ..................... | H04R 17/02 |
| 2021/0012765 A1 * | 1/2021 | Weisz ................ | G10L 15/1815 |
| 2021/0050004 A1 * | 2/2021 | Whiting ................ | G10L 15/02 |
| 2021/0082311 A1 * | 3/2021 | Karas ................... | G10L 15/187 |
| 2021/0104225 A1 * | 4/2021 | Borgeat ................. | G10L 25/27 |
| 2021/0118467 A1 * | 4/2021 | Chen ...................... | G10L 25/87 |
| 2021/0168488 A1 * | 6/2021 | Zhang ................... | H04R 1/1016 |
| 2021/0182488 A1 * | 6/2021 | Gharpure .............. | G06F 40/284 |
| 2021/0183366 A1 * | 6/2021 | Reinspach ............. | G10L 15/02 |
| 2021/0183378 A1 * | 6/2021 | Gharpure ............... | G10L 15/02 |
| 2021/0192244 A1 * | 6/2021 | Lesso ..................... | G06F 21/32 |
| 2021/0193119 A1 * | 6/2021 | Lee ...................... | G06N 3/0442 |
| 2021/0201888 A1 * | 7/2021 | Bradshaw .............. | G10L 15/02 |
| 2021/0210081 A1 * | 7/2021 | Park ...................... | G10L 15/22 |
| 2021/0225392 A1 * | 7/2021 | Gharpure .............. | G10L 15/10 |
| 2021/0227338 A1 * | 7/2021 | Abdallah Abdelrehim | |
| | | Abokela ............. | H04R 25/507 |
| 2021/0264915 A1 * | 8/2021 | Nagata ................... | G10L 15/24 |
| 2021/0312901 A1 * | 10/2021 | Relin .................... | G10L 15/187 |
| 2021/0319783 A1 * | 10/2021 | Masumura ........... | G10L 15/063 |
| 2021/0321213 A1 * | 10/2021 | Selfon .................... | H04R 1/406 |
| 2021/0350784 A1 * | 11/2021 | Selvaggi ............... | G10L 13/047 |
| 2021/0375260 A1 * | 12/2021 | Yu ......................... | G10L 15/142 |
| 2021/0390949 A1 * | 12/2021 | Wang .................... | G06N 20/00 |
| 2021/0397866 A1 * | 12/2021 | Ishikawa ................ | G06F 3/167 |
| 2021/0398521 A1 * | 12/2021 | Hwang .................. | G10L 15/02 |
| 2022/0004870 A1 * | 1/2022 | Wang .................... | G06N 3/048 |
| 2022/0005462 A1 * | 1/2022 | Hwang .................. | G10L 15/06 |
| 2022/0028393 A1 * | 1/2022 | Kim ....................... | H04N 5/278 |
| 2022/0066733 A1 * | 3/2022 | Tsuruga ................. | H04R 3/00 |
| 2022/0068266 A1 * | 3/2022 | Campbell .............. | G10L 15/28 |
| 2022/0084537 A1 * | 3/2022 | Wexler .................. | G10L 21/003 |
| 2022/0208173 A1 * | 6/2022 | Chang ................... | G10L 13/027 |
| 2022/0230627 A1 * | 7/2022 | Chang ................... | G10L 15/22 |
| 2022/0269929 A1 * | 8/2022 | Rongala ................ | G06N 3/0895 |
| 2022/0301562 A1 * | 9/2022 | Robert Jose ........... | G10L 15/28 |
| 2022/0366909 A1 * | 11/2022 | Iwase .................... | G10L 25/48 |
| 2022/0386014 A1 * | 12/2022 | Wang .................. | H04R 1/1025 |
| 2022/0415308 A1 * | 12/2022 | Berisha ................. | G10L 15/30 |
| 2023/0329630 A1 * | 10/2023 | Patel ...................... | A61B 5/08 |
| 2025/0061894 A1 * | 2/2025 | Campbell .............. | H04R 3/005 |

FOREIGN PATENT DOCUMENTS

| | | |
|---|---|---|
| JP | 2019-208138 | 12/2019 |
| JP | 2020-064199 | 4/2020 |
| WO | 2008/062782 | 5/2008 |
| WO | 2015/190360 | 12/2015 |

* cited by examiner

FIG.1

AMPLITUDE

[INPUT VIBRATION WAVE Va]

TIME

AMPLITUDE

[OUTPUT VIBRATION WAVE Vb]

TIME

AMPLITUDE

[DIFFERENCE WAVE Vd]

TIME

FIG.5

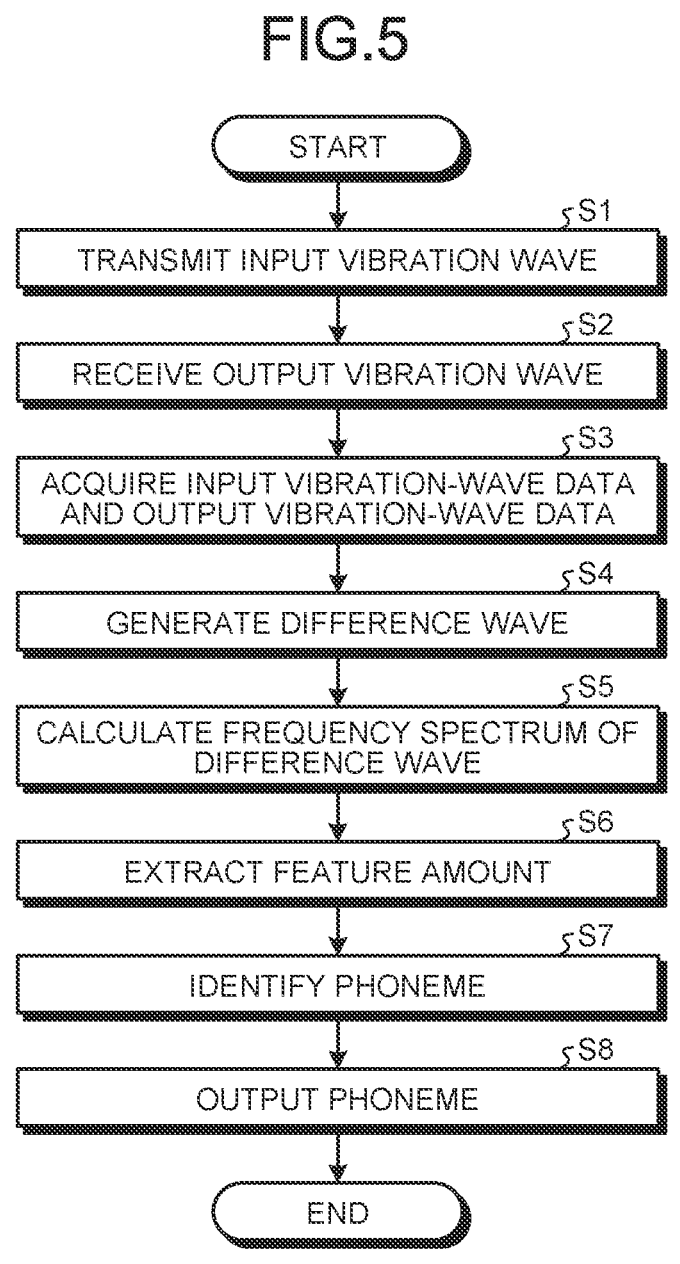

START

S1
TRANSMIT INPUT VIBRATION WAVE

S2
RECEIVE OUTPUT VIBRATION WAVE

S3
ACQUIRE INPUT VIBRATION-WAVE DATA
AND OUTPUT VIBRATION-WAVE DATA

S4
GENERATE DIFFERENCE WAVE

S5
CALCULATE FREQUENCY SPECTRUM OF
DIFFERENCE WAVE

S6
EXTRACT FEATURE AMOUNT

S7
IDENTIFY PHONEME

S8
OUTPUT PHONEME

END

FIG.6

COMMUNICATION DEVICE, COMMUNICATION METHOD, AND NON-TRANSITORY STORAGE MEDIUM

CROSS-REFERENCE TO RELATED APPLICATIONS

This application is a Continuation of PCT International Application No. PCT/JP2021/035085 filed on Sep. 24, 2021 which claims the benefit of priority from Japanese Patent Application No. 2020-160163 filed on Sep. 24, 2020, the entire contents of both of which are incorporated herein by reference.

FIELD OF THE INVENTION

The present application relates to a communication device, a communication method, and a non-transitory storage medium.

BACKGROUND OF THE INVENTION

As disclosed in Japanese Patent Application Laid-open No. 2019-208138 A, a technique of recognizing speech of a user has been known.

A technique that enables recognition of phonemes that a subject intends to speak in an environment in which the subject cannot utter, or in an environment in which the subject must utter in a low voice has been desired.

SUMMARY OF THE INVENTION

A communication device, a communication method, and a non-transitory storage medium are disclosed.

According to one aspect of the present application, there is provided a communication device comprising: a vibration transmitting unit configured to transmit an input vibration wave to a first portion of a subject; a vibration receiving unit configured to receive, at a second portion of the subject, an output vibration wave generated based on the input vibration wave propagated through at least a part of the subject; and a speech recognition device configured to recognize a phoneme which is uttered by the subject based on a difference wave between the input vibration wave and the output vibration wave, wherein the first portion and the second portion are arranged on right and left of the subject.

According to one aspect of the present application, there is provided a communication method comprising: transmitting an input vibration wave to a first portion of a subject; receiving, at a second portion of the subject, an output vibration wave generated based on the input vibration wave propagated through at least a part of the subject; and recognizing a phoneme which is uttered by the subject based on a difference wave between the input vibration wave and the output vibration wave, wherein the first portion and the second portion are arranged on right and left of the subject.

According to one aspect of the present application, there is provided a non-transitory storage medium that stores a computer-program for causing a computer to execute a communication method including: transmitting an input vibration wave to a first portion of a subject; receiving, at a second portion of the subject, an output vibration wave generated based on the input vibration wave propagated through at least a part of the subject; and recognizing a phoneme which is uttered by the subject based on a difference wave between the input vibration wave and the output vibration wave, wherein the first portion and the second portion are arranged on right and left of the subject.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 1 is a schematic diagram illustrating a communication device according to a first embodiment;

FIG. 5 is a flowchart illustrating a communication method according to the first embodiment; and FIG. 6 is a schematic diagram illustrating a communication device according to a second embodiment.

DETAILED DESCRIPTION OF THE INVENTION

Figure 2:
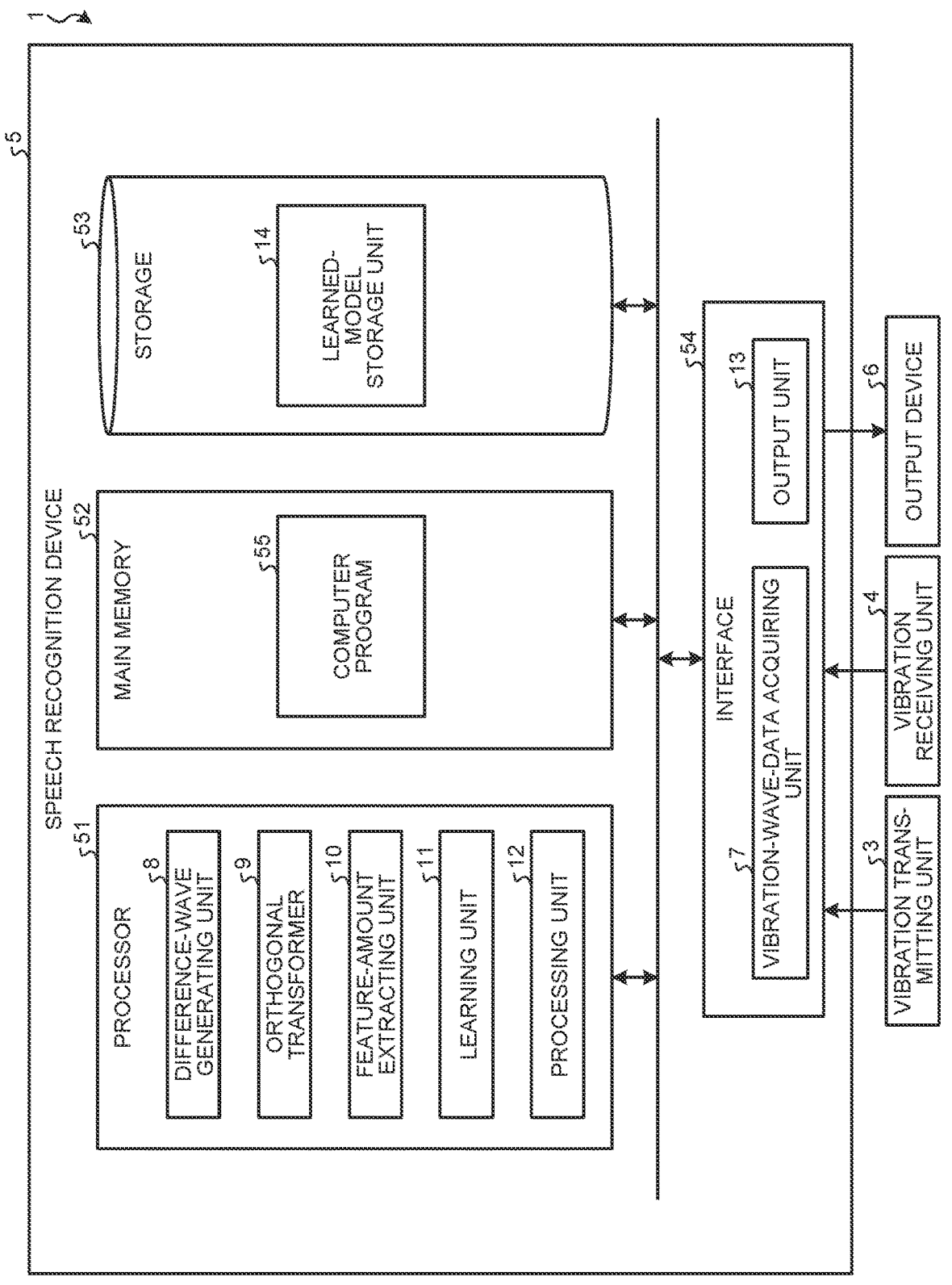
FIG. 2 is a functional block diagram illustrating a speech recognition device according to the first embodiment.

Hereinafter, embodiments of the present application will be explained in detail based on the drawings. The embodiments below are not intended to limit the present application.

First Embodiment

Communication Device

Figure 1:
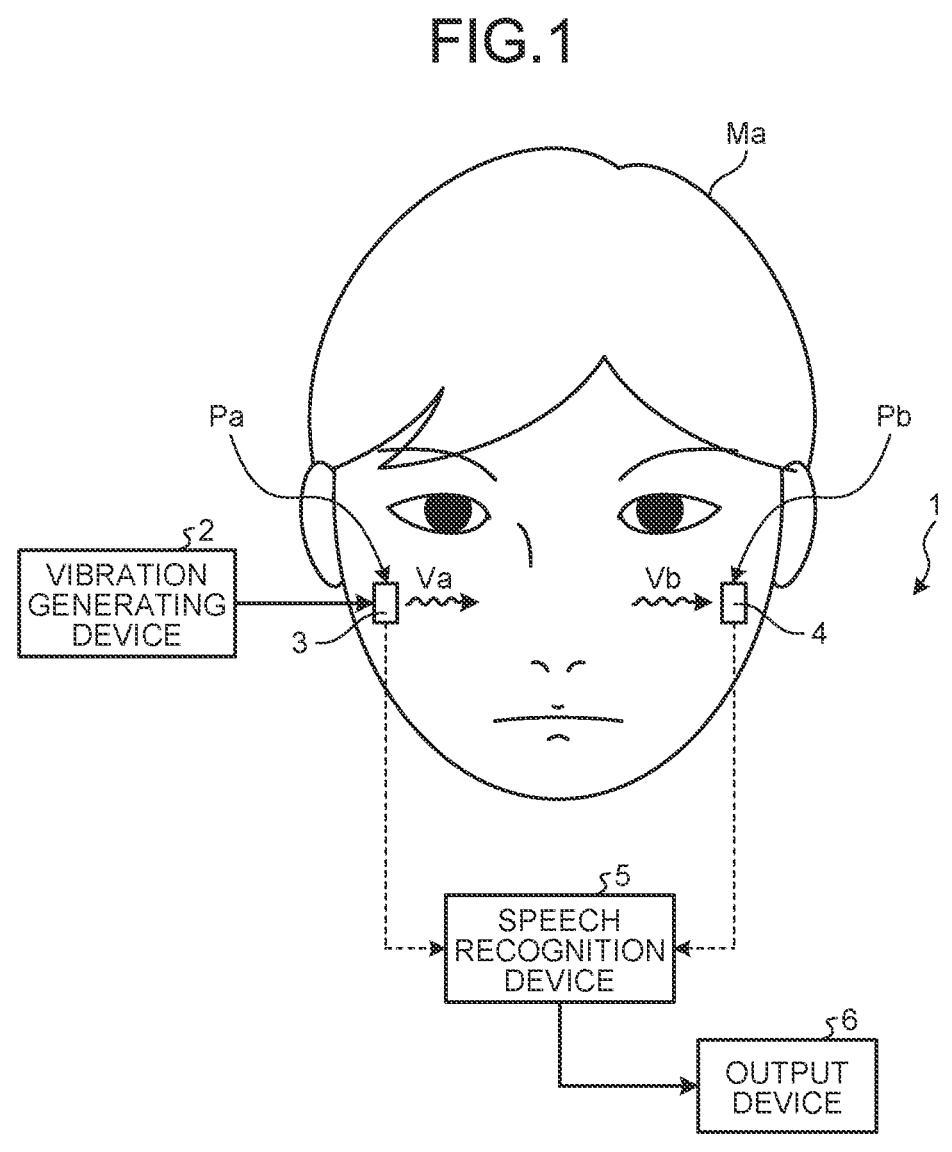

FIG. 1 is a schematic diagram illustrating a communication device 1 according to the present embodiment. As illustrated in FIG. 1, the communication device 1 includes a vibration generating device 2, a vibration transmitting unit 3, a vibration receiving unit 4, a speech recognition device 5, and an output device 6.

The vibration generating device 2 generates an input vibration wave Va of a predetermined frequency. In the present embodiment, the input vibration wave Va is an ultrasonic wave.

The vibration transmitting unit 3 vibrates based on the input vibration wave Va generated by the vibration generating device 2. The vibration transmitting unit 3 is set at a first portion Pa of a body of a subject Ma. The vibration transmitting unit 3 transmits the input vibration wave Va to the first portion Pa. The input vibration wave Va propagates through at least a part of the body of the subject Ma.

The vibration receiving unit 4 receives an output vibration wave Vb generated based on the input vibration wave Va that has propagated through at least a part of the body of the subject Ma. The vibration receiving unit 4 is set at a second portion Pb of the body of the subject Ma. The second portion Pb differs from the first portion Pa. The vibration receiving unit 4 receives the output vibration wave Vb at the second portion Pb.

Skeletal frames of the subject Ma that is a human being is bilaterally symmetrical. Technically, Head skeletons of human are not bilaterally asymmetrical, but respective parts, such as eyes, nose, and mouth, are regarded as arranged on right and left of the subject in a substantially bilaterally symmetrical manner. Based on such a symmetry, the first portion Pa and the second portion Pb are preferable to be arranged on right and left of the subject at bilaterally symmetrical positions with respect to a center line of the body of the subject Ma. The center line extends in a vertical direction of the subject Ma.

In the present embodiment, each of the first portion Pa and the second portion Pb is designated on the face of the subject Ma. Each of the first portion Pa and the second portion Pb is designated to at least a portion around each of the ear of the subject Ma. The vibration transmitting unit 3 and the vibration receiving unit 4 are preferable to be arranged on right and left of the subject at bilaterally symmetrical positions with respect to a center line of the face. The communication device 1 may include multiple sets of the vibration transmitting unit 3 and the vibration receiving unit 4. In a human body, characteristics in propagation of vibration varies in real time according to changes in posture, facial expression, and the like. By such a variation in characteristics, a frequency band that easily propagates through human body and a frequency band that propagates less easily therethrough can be caused depending on various situations. By providing multiple sets of the vibration transmitting unit 3 and the vibration receiving unit 4 at different positions on a human body, a frequency band that less easily propagates in one set of the vibration transmitting unit 3 and the vibration receiving unit 4 can easily propagate in another set of the vibration transmitting unit 3 and the vibration receiving unit 4. Therefore, there is a case in which the communication device 1 can improve accuracy in receiving the vibration by providing multiple sets of the vibration transmitting unit 3 and the vibration receiving unit 4.

In the present embodiment, each of the first portion Pa and the second portion Pb is more preferable to be designated to an articular disc of a temporomandibular joint. The first portion Pa is more preferable to be designated to an articular disc of the right side of the face, and the second portion Pb is more preferable to be designated to an articular disc of the left side of the face. The vibration transmitting unit 3 is more preferable to be set at the articular disc of the right side of the face. The vibration receiving unit 4 is more preferable to be set at the articular disc of the left side of the face.

The input vibration wave Va transmitted from the vibration transmitting unit 3 to the first portion Pa propagates through a upper jaw, a lower jaw, and the like to reach the second portion Pb as the output vibration wave Vb. The vibration receiving unit 4 receives the output vibration wave Vb that has reached the second portion Pb.

A propagation characteristic of a vibration wave between the first portion Pa and the second portion Pb varies depending on how a mouth of the subject Ma is opened. Therefore, a frequency characteristic of the output vibration wave Vb received by the vibration receiving unit 4 varies depending on how the mouth of the subject Ma is opened. For example, a frequency characteristic of the output vibration wave Vb that is received by the vibration receiving unit 4 when the subject Ma opens the mouth to utter a phoneme "a" and a frequency characteristic of the output vibration wave Vb that is received by the vibration receiving unit 4 when the subject Ma opens the mouth to utter a phoneme "su" are different.

The speech recognition device 5 recognizes a phoneme uttered by the subject Ma based on a difference wave Vd between the input vibration wave Va transmitted by the vibration transmitting unit 3 and the output vibration wave Vb received by the vibration receiving unit 4. The speech recognition device 5 recognizes a phoneme which the subject Ma intends to utter even if the subject Ma does not actually utter, based on the difference wave Vd. The speech recognition device 5 may recognize a phoneme which is uttered by the subject Ma based on the difference wave Vd, for example, when the subject Ma utters in a low voice.

Speech Recognition Device

FIG. 2 is a functional block diagram illustrating the speech recognition device 5 according to the present embodiment. The speech recognition device 5 includes a computer. The speech recognition device 5 includes a processor 51, a main memory 52, a storage 53, and an interface 54. Examples of the processor 51 include a central processor (CPU) or a micro processor (MPU). Examples of the main memory 52 include a non-volatile memory or volatile memory. Examples of the non-volatile memory include a read only memory (ROM). Examples of the volatile memory include a random access memory (RAM). Examples of the storage 53 include a hard disk drive (HDD) or a solid state drive (SSD). Examples of the interface 54 include an input/output circuit or a communication circuit.

A computer program 55 is expanded in the main memory 52. The processor 51 performs a communication method according to the present embodiment according to the computer program 55. The interface 54 is connected to the vibration transmitting unit 3, the vibration receiving unit 4, and the output device 6, respectively.

The speech recognition device 5 includes a vibration-wave-data acquiring unit 7, a difference-wave generating unit 8, an orthogonal transformation unit 9, a feature-amount extracting unit 10, a learning unit 11, a processing unit 12, an output unit 13, and a learned-model storage unit 14. It is not necessarily required that the speech recognition device 5 has the learning unit 11. The speech recognition device 5 may store a learned model that has been learned in a device different from the speech recognition device 5 in the learned-model storage unit 14.

The processor 51 functions as the difference-wave generating unit 8, the orthogonal transformer 9, the feature-amount extracting unit 10, the learning unit 11, and the processing unit 12. The learning unit 11 is an optional component as described previously. The storage 53 functions as the learned-model storage unit 14. The interface 54 functions as the vibration-wave-data acquiring unit 7 and the output unit 13.

The vibration-wave-data acquiring unit 7 acquires input vibration-wave data indicating the input vibration wave Va from the vibration transmitting unit 3. Moreover, the vibration-wave-data acquiring unit 7 acquires output vibration-wave data indicating the output vibration wave Vb from the vibration receiving unit 4.

The difference-wave generating unit 8 generates the difference wave Vd between the input vibration wave Va and the output vibration wave Vb based on the input vibration-wave data and the output vibration-wave data acquired by the vibration-wave-data acquiring unit 7.

Figure 3:
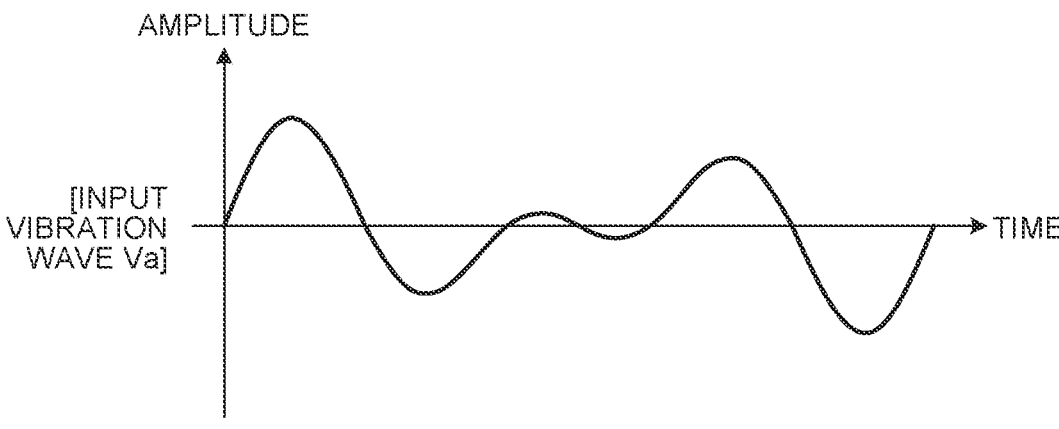
FIG. 3 is a diagram schematically illustrating a relationship among an input vibration wave, an output vibration wave, and a difference wave according to the first embodiment.
Figure 3:
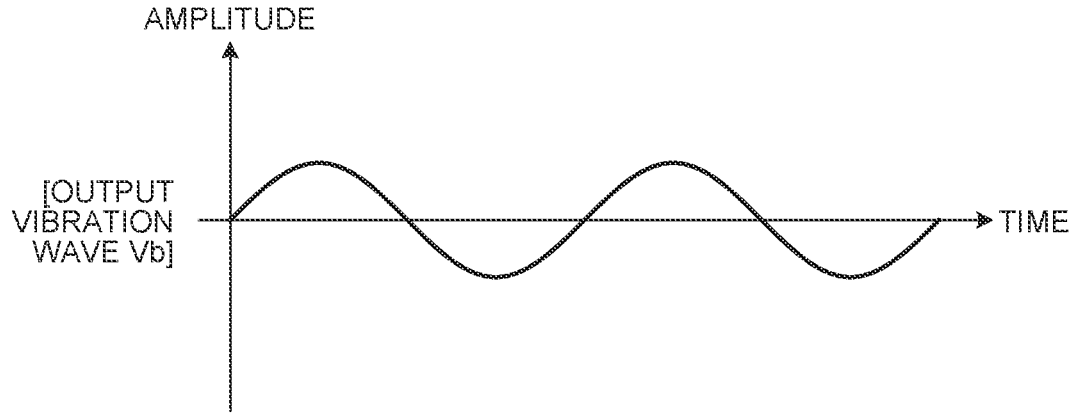
Figure 3:
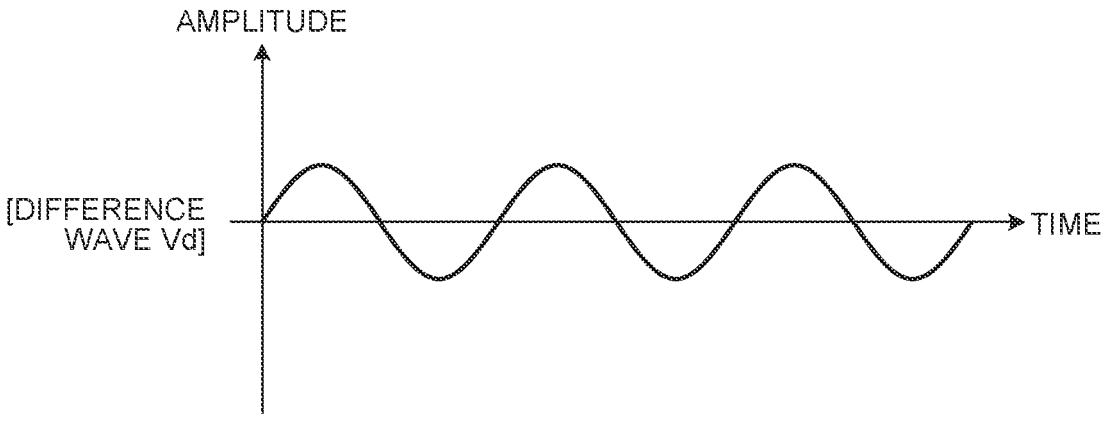

FIG. 3 is a diagram schematically illustrating a relationship among the input vibration wave Va, the output vibration wave Vb, and the difference wave Vd according to the present embodiment. In the present embodiment, the vibration transmitting unit 3 transmits an arbitrary one of the input vibration wave Va. The output vibration wave Vb received by the vibration receiving unit 4 varies depending on how the mouth of the subject Ma is opened. The difference-wave generating unit 8 generates the difference wave Vd indicating a difference between the input vibration wave Va and the output vibration wave Vb. The difference between the input vibration wave Va and the output vibration wave Vb signifies a difference between an amplitude of the input vibration wave Va and an amplitude of the output vibration wave Vb. The difference-wave generating unit 8 may generate the difference wave Vd after smoothing the input vibration wave Va and the output vibration wave Vb in a time direction. The difference-wave generating unit 8 may smooth the difference wave Vd in a time direction to form the difference wave Vd.

In the present embodiment, the difference-wave generating unit 8 generates the difference wave Vd based on the input vibration wave Va and the output vibration wave Vb that are acquired by the vibration-wave-data acquiring unit 7 at the same point of time. For example, the difference-wave generating unit 8 calculates an amplitude of the difference wave Vd at a time t0 based on a difference between the amplitude of the input vibration wave Va that is acquired at the time t0 and the amplitude of the output vibration wave Vb that is acquired at the time t0.

The difference-wave generating unit 8 may generate the difference wave Vd based on the input vibration wave Va that is acquired at a first time t1 and the output vibration wave Vb that is acquired at a second time t2 later than the first time t1. A difference between the first time t1 and the second time t2 corresponds to time until the input vibration wave Va transmitted to the first portion Pa reaches the second portion Pb as the output vibration wave Vb. The difference-wave generating unit 8 may calculate an amplitude of the difference wave Vd based on a difference between the amplitude of the input vibration wave Va that is acquired at the first time t1 and the amplitude of the output vibration wave Vb that is acquired at the second time t2.

The orthogonal transformer 9 performs orthogonal transformation on the difference wave Vd generated by the difference-wave generating unit 8, to calculate a frequency spectrum of the difference wave Vd. In the present embodiment, the orthogonal transformer 9 calculates the frequency spectrum of the difference wave Vd by performing fast Fourier transform (FFT) on the difference wave Vd as orthogonal transformation. The orthogonal transformer 9 may cut out the difference wave Vd as a signal for a predetermined time length by using a window function of the predetermined time length, and may calculate the frequency spectrum of the difference wave Vd by performing orthogonal transformation on the respective signals cut out. The orthogonal transformer 9 may acquire a spectrogram from the frequency spectrum of the difference wave Vd of each predetermined time length. The spectrogram is a three-dimensional graph constituted of time, frequency, and intensity of a signal component (amplitude), and indicates time variation of the frequency spectrum.

Figure 4:
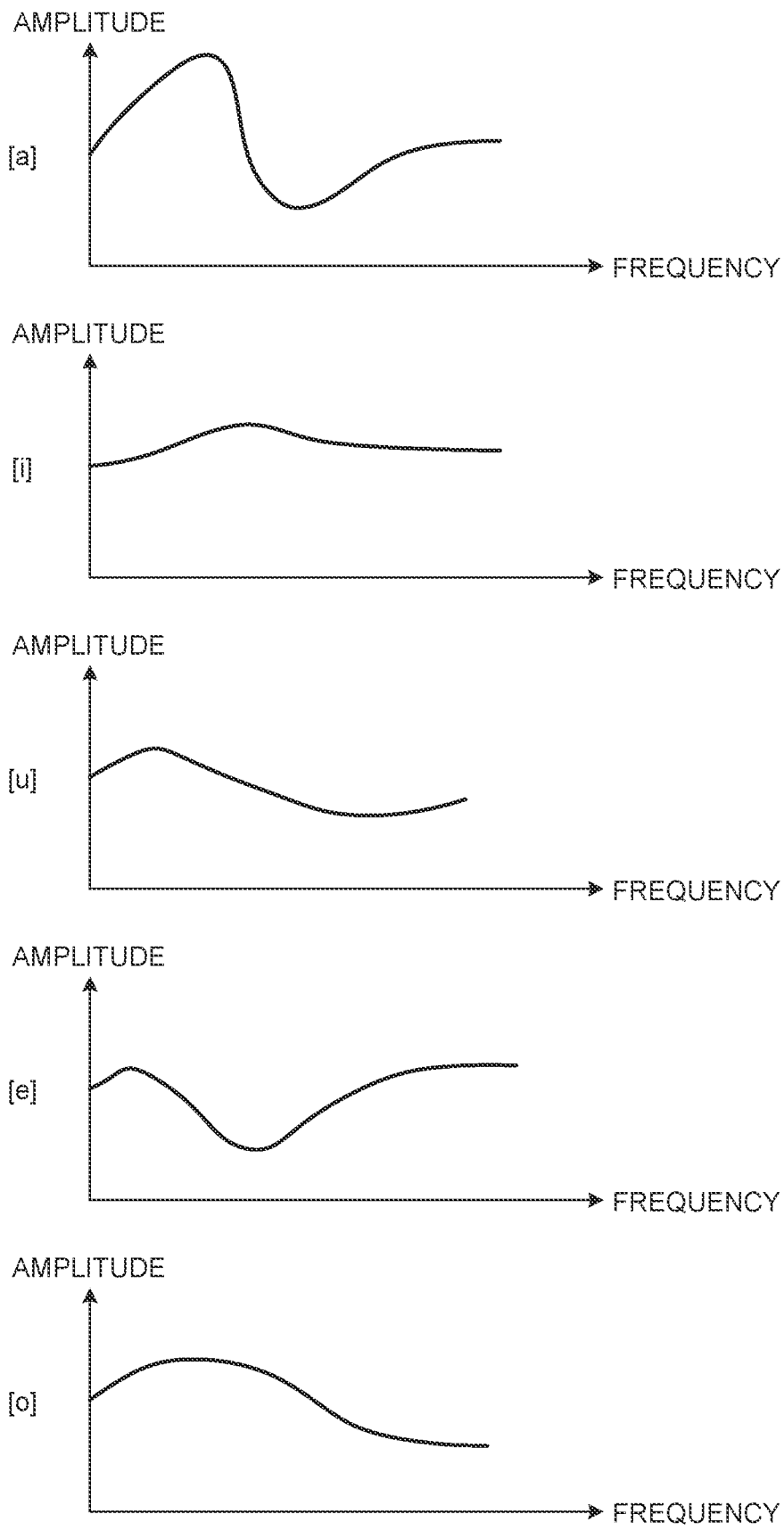
FIG. 4 is a diagram schematically illustrating a frequency spectrum of the difference wave according to the first embodiment.

FIG. 4 is a diagram schematically illustrating a frequency spectrum of the difference wave Vd according to the present embodiment. The frequency spectrum indicates a relationship between frequency and amplitude. FIG. 4 shows frequency spectrums of the difference wave Vd when the subject Ma opens the mouth to utter respective phonemes of "a", "i", "u", "e", and "o". FIG. 4 schematically shows that the frequency spectrum of the difference wave Vd varies for different phonemes. The feature-amount of the frequency spectrum of the difference wave Vd varies according to how the mouth of the subject Ma is opened, a structure of jaw bones, the size of the jaw bones, how a tongue is used, a fundamental frequency generated from a throat, and the like.

In the present embodiment, as the feature-amount of the frequency spectrum of the difference wave Vd, a shape of an envelope of the frequency spectrum may be used. The feature-amount extracting unit 10 may acquire the envelope of the frequency spectrum by connecting respective maximum amplitude values (maximum power values) of respective multiple frequencies. The maximum amplitude value is a maximum value of an absolute value of the amplitude. That is, the feature-amount of the frequency spectrum is a two-dimensional form (spectral form) of the envelope in a two-dimensional surface defined by a frequency axis and an amplitude axis. The feature-amount extracting unit 10 may acquire the envelope by smoothing the frequency spectrum of the difference wave Vd in a frequency direction. The feature-amount extracting unit 10 may smooth the frequency spectrum of the difference wave Vd by using a publicly-known moving average method, the Svitzky-Golay method, and the like. The feature-amount extracting unit 10 may use a spectrogram as the feature-amount. The feature-amount extracting unit 10 may acquire a smoothed spectrogram as the feature-amount by applying a publicly-known smoothing filter, such as Gaussian filter to a spectrogram.

The feature-amount extracting unit 10 may generate the feature-amount by extracting a multi-dimensional vector defined by frequency and amplitude from the envelope of the frequency spectrum of the difference wave Vd. The feature-amount extracting unit 10 may generate the feature-amount by extracting a multi-dimensional vector defined by time, frequency, and amplitude from the spectrogram of the difference wave Vd. The feature-amount extracting unit 10 may extract the feature-amount of the difference wave Vd geometrically from the envelope of the frequency spectrum or the spectrogram. That is, the feature-amount extracting unit 10 may takes the envelope of the frequency spectrum or the spectrogram of the difference wave Vd as a two-dimensional image, and extract the feature-amount from the two-dimensional image by using a publicly known method. Examples of an extracting method of the feature-amount from the two-dimensional image include a method of using a local feature-amount and a Fisher weight map.

The learning unit 11 acquires teacher data that indicates a relationship between the phoneme uttered by the subject Ma and the frequency spectrum of the difference wave Vd. In the teacher data, the phoneme which is uttered by the subject Ma may be a phoneme which was actually uttered by the subject Ma. In the teacher data, the frequency spectrum of the difference wave Vd includes the feature-amount of the frequency spectrum of the difference wave Vd. As the feature-amount of the frequency spectrum of the difference wave Vd, the various feature-amounts described as the examples previously, such as the shape of the envelope of the frequency spectrum, can be used. The learning unit 11 performs machine learning based on the acquired teacher data, and generates a learned model into which the frequency spectrum of the difference wave Vd is input and from which the phoneme uttered by the subject Ma is output. The learning unit 11 may generate the feature-amount to be a reference for each phoneme, instead of the machine learning. In this case, the processing unit 12 described later acquires a similarity between the feature-amount of the difference wave Vd extracted by the feature-amount extracting unit 10 and the feature-amount to be a reference, and may identify the phoneme corresponding to the feature-amount to be a reference, the similarity of which is the highest, as the phoneme uttered by the subject Ma. The processing unit 12 may calculate the similarity by using a publicly-known method, such as cosine similarity.

The learning unit 11 may use various kinds of publicly-known methods, such as Gaussian mixture model (GMM), hidden Malkov model using Gaussian mixture model (GMM-HMM), convolutional neural network (CNN), and recurrent neural network (RNN), as a method of machine learning. The learning unit 11 is preferable to use GMM or CNN when the feature-amount does not include information of time variation. The learning unit 11 is preferable to use GMM-HMM or RNN when the feature-amount includes information of time variation. The learning unit 11 may use CNN with handling the spectrogram that is the feature-amount including information of time variation as the two-dimensional image. The learned model generated by the learning unit 11 is stored in the learned-model storage unit 14. As described above, the learning unit 11 is an optional component in the speech recognition device 5 according to the present embodiment.

The processing unit 12 identifies the phoneme uttered by the subject Ma based on the feature-amount of the difference wave Vd that is extracted by the feature-amount extracting unit 10. In the present embodiment, the processing unit 12 inputs the feature-amount of the difference wave Vd extracted by the feature-amount extracting unit 10 into the learned model, acquires the phoneme which is regarded to have the highest conformity, and identifies the phoneme uttered by the subject Ma. The processing unit 12 may identify the phoneme, considering a connection between the previous phoneme and the next phoneme. For example, the processing unit 12 may acquire a transition probability from the previous phoneme to the next phoneme, and may identify the phoneme by combining the transition probability with a conformity of the phoneme in the learned model. The processing unit 12 may acquire the phoneme having the largest product of the transition probability from the previous phoneme to the next phoneme and the conformity of the phoneme in the learned model, to obtain as an identification result.

The output unit 13 outputs the phoneme identified by the processing unit 12 to the output device 6. Examples of the output device 6 include a character display device or a sound output device. The character display device is, for example, a liquid crystal display. The sound output device is, for example, a speaker. When the output unit 6 is the character display device, the phoneme identified by the processing unit 12 is displayed as a character on the character display device. A group of the phonemes uttered by the subject Ma is displayed as a character string on the character display device. When the output device 6 is the sound output device, the phoneme identified by the processing unit 12 is output from the sound output device as a sound. A group of the phonemes uttered by the subject Ma is output as a sound from the sound output device. When the output device 6 is located away from the speech recognition device 5, the output unit 13 may transmit the phoneme identified by the processing unit 12 to the output device 6 through a network.

Communication Method

FIG. 5 is a flowchart illustrating a communication method according to the present embodiment. The computer program 55 can cause the speech recognition device 5 to perform a communication method.

The vibration generating device 2 vibrates the vibration transmitting unit 3 that is set at the first portion Pa of the body of the subject Ma. The vibration transmitting unit 3 transmits the input vibration wave Va to the first portion Pa (step S1).

The input vibration wave Va transmitted to the first portion Pa propagates through at least a part of the face of the subject Ma. The vibration receiving unit 4 receives the output vibration wave Vb at the second portion Pb (step S2).

The vibration-wave-data acquiring unit 7 acquires the input vibration-wave data indicating the input vibration wave Va that has been transmitted to the first portion Pa at step S1. Moreover, the vibration-wave-data acquiring unit 7 acquires output vibration-wave data indicating the output vibration wave Vb that has been received at the second portion Pb at step S2 (step S3).

The difference-wave generating unit 8 generates the difference wave Vd between the input vibration wave Va and the output vibration wave Vb based on the input vibration-wave data and the output vibration-wave data acquired at step S3 (step S4).

The orthogonal transformer 9 performs orthogonal transformation on the difference wave Vd generated at step S4, to calculate a frequency spectrum of the difference wave Vd (step S5).

The feature-amount extracting unit 10 extracts a feature amount of the frequency spectrum of the difference wave Vd that has been calculated at step S5 (step S6).

The processing unit 12 inputs the feature amount of the frequency spectrum of the difference wave Vd extracted at step S6 into the learned model, to identify a phoneme which the subject Ma intends to utter (step S7).

The output unit 13 outputs the phoneme identified at step S7 to the output device 6 (step S8).

A character or a sound based on the phoneme which the subject Ma intends to utter is output from the output device 6.

As explained above, according to the present embodiment, the input vibration wave Va is transmitted to the first portion Pa of the body of the subject Ma. The output vibration wave Vb generated based on the input vibration wave Va that has propagated through at least a part of the body of the subject Ma is received at the second portion Pb of the body of the subject Ma. A propagation characteristic of the vibration wave between the first portion Pa and the second portion Pb varies depending on a phoneme uttered by the subject Ma. Thus, the speech recognition device 5 can recognize a phoneme which the subject Ma intends to utter based on the difference wave Vd between the input vibration wave Va and the output vibration wave Vb even if the subject Ma does not actually utter. Therefore, a phoneme which the subject Ma intends to utter can be recognized even in an environment in which the subject Ma cannot utter, or in an environment in which the subject Ma must utter in a low voice.

The first portion Pa at which the vibration transmitting unit 3 is set and the second portion Pb at which the vibration receiving unit 4 is set are different parts of a body. Because a transmitting function and a receiving function of a vibration wave are separated, interference of the vibration wave is less likely to occur. Therefore, a phoneme uttered by the subject Ma can be recognized at a high accuracy.

The first portion Pa and the second portion Pb are positioned on right and left of the subject at bilaterally symmetrical positions with respect to the center line of the body of the subject Ma. Moreover, the first portion Pa and the second portion Pb are set at organs of the same function in the body of the subject Ma. In the present embodiment, the first portion Pa and the second portion Pb are set at articular discs. Thus, an influence of disturbance to the vibration wave is suppressed, and a frequency spectrum having a preferable signal noise ratio can be obtained.

In the present embodiment, the input vibration wave Va is ultrasonic wave. Ultrasonic waves have higher straightness than acoustic waves of an audible band. Therefore, since a relative position of the first portion Pa at which the vibration transmitting unit 3 is set and the second portion Pb at which the vibration receiving unit 4 is set is appropriately determined, the vibration receiving unit 4 can receive the output vibration wave Vb with high sensitivity.

Second Embodiment

A second embodiment will be explained. In the following explanation, identical reference symbols are assigned to identical or equivalent components to the embodiment described above, and explanation of the components will be simplified or omitted.

Figure 6:
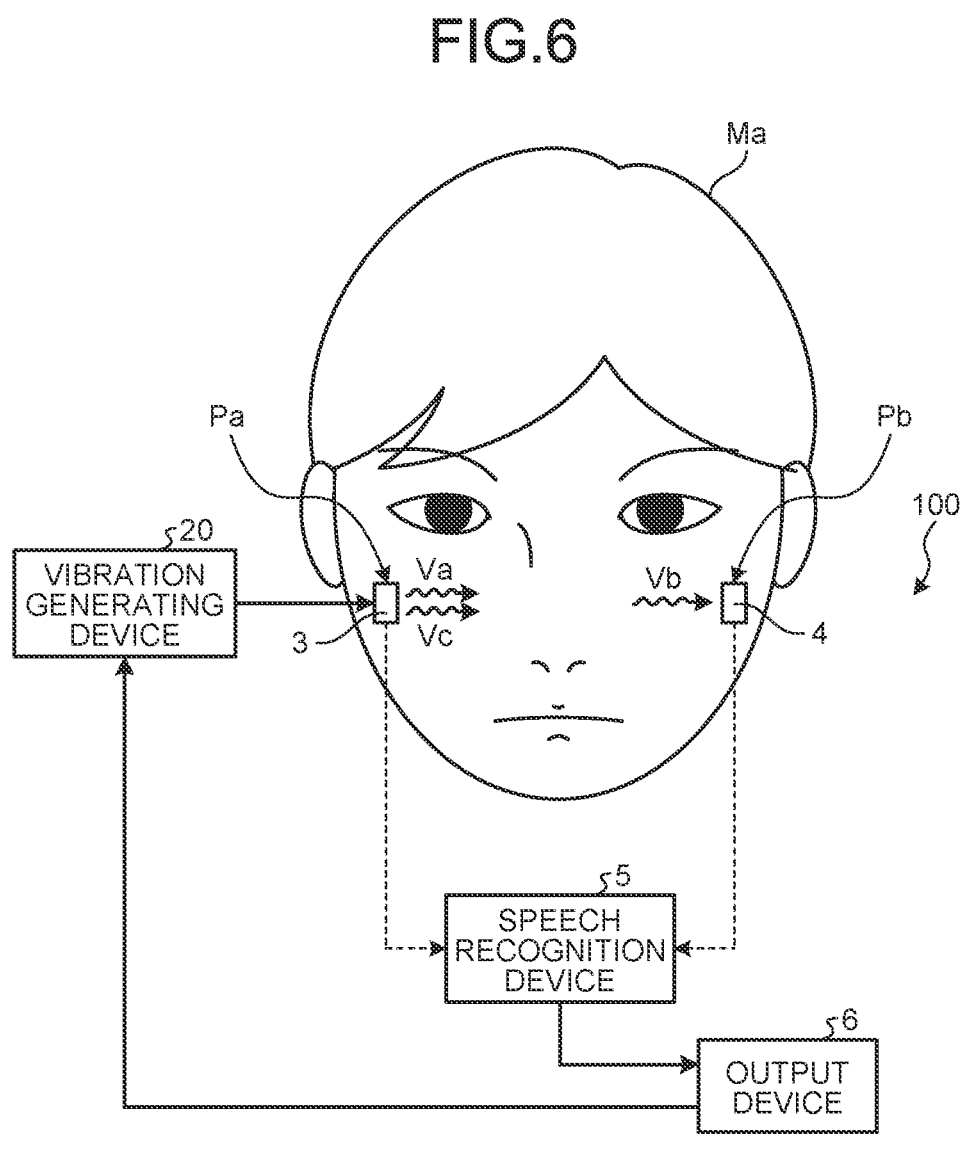

FIG. 6 is a schematic diagram illustrating a communication device 100 according to the present embodiment. In the present embodiment, a vibration generating device 20 generates the input vibration wave Va, which is an ultrasonic wave, and an acoustic wave Vc of an audible band. The vibration transmitting unit 3 transmits the input vibration wave Va of an ultrasonic wave and the acoustic wave Vc of an audible band to the first portion Pa at the same time.

The first portion Pa is designated to at least a part of a portion around the right ear of the subject Ma. As the acoustic wave Vc of an audible band is transmitted to the first portion Pa, the subject Ma can hear the acoustic wave Vc with the right ear. The acoustic wave Vc may transferred to an auditory nerve of the right ear as a bone conduction sound, or may be transferred to an eardrum of the right ear as an aerial conduction sound.

Similarly to the embodiment described above, the input vibration wave Va propagates on at least a part of the face to be transmitted to the second portion Pb. The vibration receiving unit 4 receives the output vibration wave Vb generated based on the input vibration wave Va at the second portion Pb. Furthermore, the acoustic wave Vc is also transmitted to the second portion Pb. The second portion Pb is designated to at least a part of a portion around the left ear of the subject Ma. Since the acoustic wave Vc of an audible band is transmitted to the second portion Pb, the subject Ma can hear the acoustic wave Vc not only with the right ear, but also with the left ear. That is, the subject Ma can hear the acoustic wave Vc with both ears. The acoustic wave Vc may be transferred to an auditory nerve of the left ear as a bone conduction sound, or may be transferred to an eardrum of the left ear as an aerial conduction sound.

It is preferable that the difference wave Vd do not include a component of the acoustic wave Vc. Therefore, low-pass filter processing to cut the acoustic wave Vc may be performed so that the output vibration wave Vb to be received by the vibration receiving unit 4 does not include a component of the acoustic wave Vc.

The acoustic wave Vc may be a sound of a phenome which is recognized by the speech recognition device 5. When the output device 6 is a sound output device, a phenome identified by the processing unit 12 of the speech recognition device 5 can be output as a sound. The output device 6 outputs the sound of the phenome identified by the processing unit 12 to the vibration generating device 20. Thus, the vibration transmitting unit 3 can transmit the acoustic wave Vc of a phenome which the subject Ma intends to utter and which is recognized by the speech recognition device 5 to utter to the first portion Pa. The subject Ma can move the mouth without speaking while listening a sound of to the phenome which the subject Ma intends to utter.

The acoustic wave Vc may be an acoustic wave of a music content. Thus, the subject Ma can move the mouth to make communication without utterance while enjoying a music with both ears.

According to the present application, a phoneme uttered by a subject can be recognized.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication device comprising:
   a vibration transmitting unit configured to transmit an input vibration wave to a first portion of a subject;
   a vibration receiving unit configured to receive, at a second portion of the subject, an output vibration wave generated based on the input vibration wave propagated through at least a part of the subject; and
   a speech recognition device configured to recognize a phoneme uttered by the subject based on a difference wave between the input vibration wave and the output vibration wave, wherein
   the first portion and the second portion are arranged on right and left of the subject at bilaterally symmetrical positions with respect to a center line of a body of the subject,
   the first portion is designated to an articular disc of a temporomandibular joint of a right side, and
   the second portion is designated to an articular disc of a temporomandibular joint of a left side,
   wherein the speech recognition device includes:
   a difference-wave generating unit configured to calculate the difference wave;
   an orthogonal transformer configured to perform orthogonal transformation on the difference wave to calculate a frequency spectrum of the difference wave;
   a feature-amount extracting unit configured to extract a feature-amount of the difference wave; and
   a processor configured to identify a phoneme uttered by the subject based on the feature-amount extracted by the feature-amount extracting unit, and
   further comprising a learned-model storage unit configured to:
      acquire teacher data that indicates a relationship between the phoneme uttered by the subject and the frequency spectrum of the difference wave;
      generate, by performing machine learning based on the teacher data, a learned model into which the frequency spectrum is input and from which a phoneme which is uttered by the subject is output; and
      store the learned model, wherein
      the processor is further configured to identify the phoneme by inputting the feature-amount extracted by the feature-amount extracting unit into the learned model.

2. A communication method comprising:
   transmitting an input vibration wave to a first portion of a subject;
   receiving, at a second portion of the subject, an output vibration wave generated based on the input vibration wave propagated through at least a part of the subject; and
   recognizing a phoneme uttered by the subject based on a difference wave between the input vibration wave and the output vibration wave, wherein
   the first portion and the second portion are arranged on right and left of the subject at bilaterally symmetrical positions with respect to a center line of a body of the subject, the first portion is designated to an articular disc of a temporomandibular joint of a right side, and the second portion is designated to an articular disc of a temporomandibular joint of a left side, and the communication method further comprising:

calculating the difference wave;

performing orthogonal transformation on the difference wave to calculate a frequency spectrum of the difference wave;

extracting a feature-amount of the difference wave;

identifying a phoneme uttered by the subject based on the feature-amount extracted;

acquiring teacher data that indicates a relationship between the phoneme uttered by the subject and the frequency spectrum of the difference wave;

generating, by performing machine learning based on the teacher data, a learned model into which the frequency spectrum is input and from which a phoneme which is uttered by the subject is output;

storing the learned model; and identifying the phoneme by inputting the feature-amount extracted into the learned model.

3. A non-transitory storage medium that stores a computer-program for causing a computer to execute a communication method including:

transmitting an input vibration wave to a first portion of a subject;

receiving, at a second portion of the subject, an output vibration wave generated based on the input vibration wave propagated through at least a part of the subject; and recognizing a phoneme uttered by the subject based on a difference wave between the input vibration wave and the output vibration wave, wherein the first portion and the second portion are arranged on a right side and a left side of the subject at bilaterally symmetrical positions with respect to a center line of a body of the subject, the first portion is designated to an articular disc of a temporomandibular joint of a right side, and the second portion is designated to an articular disc of a temporomandibular joint of a left side, and the communication method further including:

calculating the difference wave;

performing orthogonal transformation on the difference wave to calculate a frequency spectrum of the difference wave;

extracting a feature-amount of the difference wave;

identifying a phoneme uttered by the subject based on the feature-amount extracted;

acquiring teacher data that indicates a relationship between the phoneme uttered by the subject and the frequency spectrum of the difference wave;

generating, by performing machine learning based on the teacher data, a learned model into which the frequency spectrum is input and from which a phoneme which is uttered by the subject is output;

storing the learned model; and identifying the phoneme by inputting the feature-amount extracted into the learned model.

* * * * *